United States Patent [19]

Vail et al.

[11] Patent Number: 4,702,522
[45] Date of Patent: Oct. 27, 1987

[54] SEAT ASSEMBLY WITH FOAM ENCAPSULATED LOAD-SUPPORTING FIBROUS MATRIX

[75] Inventors: Curtis F. Vail, Ann Arbor, Mich.; Duane W. Witzke, Logan, Ohio

[73] Assignee: Hoover Universal, Inc., Ann Arbor, Mich.

[21] Appl. No.: 437,715

[22] Filed: Oct. 29, 1982

[51] Int. Cl.$^4$ .............................................. A47C 7/18
[52] U.S. Cl. .................................... 297/452; 297/458; 297/DIG. 1; 297/284
[58] Field of Search ............... 297/452, 457, 284, 458, 297/455, 459; 5/446, 447, 481; 297/DIG. 1, DIG. 2

[56] References Cited

U.S. PATENT DOCUMENTS

| Re. 26,946 | 9/1970 | Getz et al. | 297/452 |
| Re. 26,947 | 9/1970 | Getz et al. | 297/452 |
| 662,647 | 11/1900 | Howe | 297/452 |
| 811,259 | 1/1906 | Taylor | 297/452 |
| 3,208,085 | 9/1965 | Grimshaw | 297/452 |
| 3,264,034 | 8/1966 | Lawson | 297/458 |
| 3,273,877 | 9/1966 | Geller et al. | 297/452 |
| 3,289,220 | 12/1966 | Grimshaw | 297/452 |
| 3,310,300 | 3/1967 | Lawson | 297/452 |

Primary Examiner—Kenneth J. Dorner
Assistant Examiner—Mark W. Binder

[57] ABSTRACT

A vehicle seat assembly consisting of a main frame, a fibrous matrix supported in a generally horizontal position on the frame and a foam body molded in place on the frame so as to encapsulate the matrix in the body in a position forming a support for a load-carrying portion of the body.

4 Claims, 5 Drawing Figures

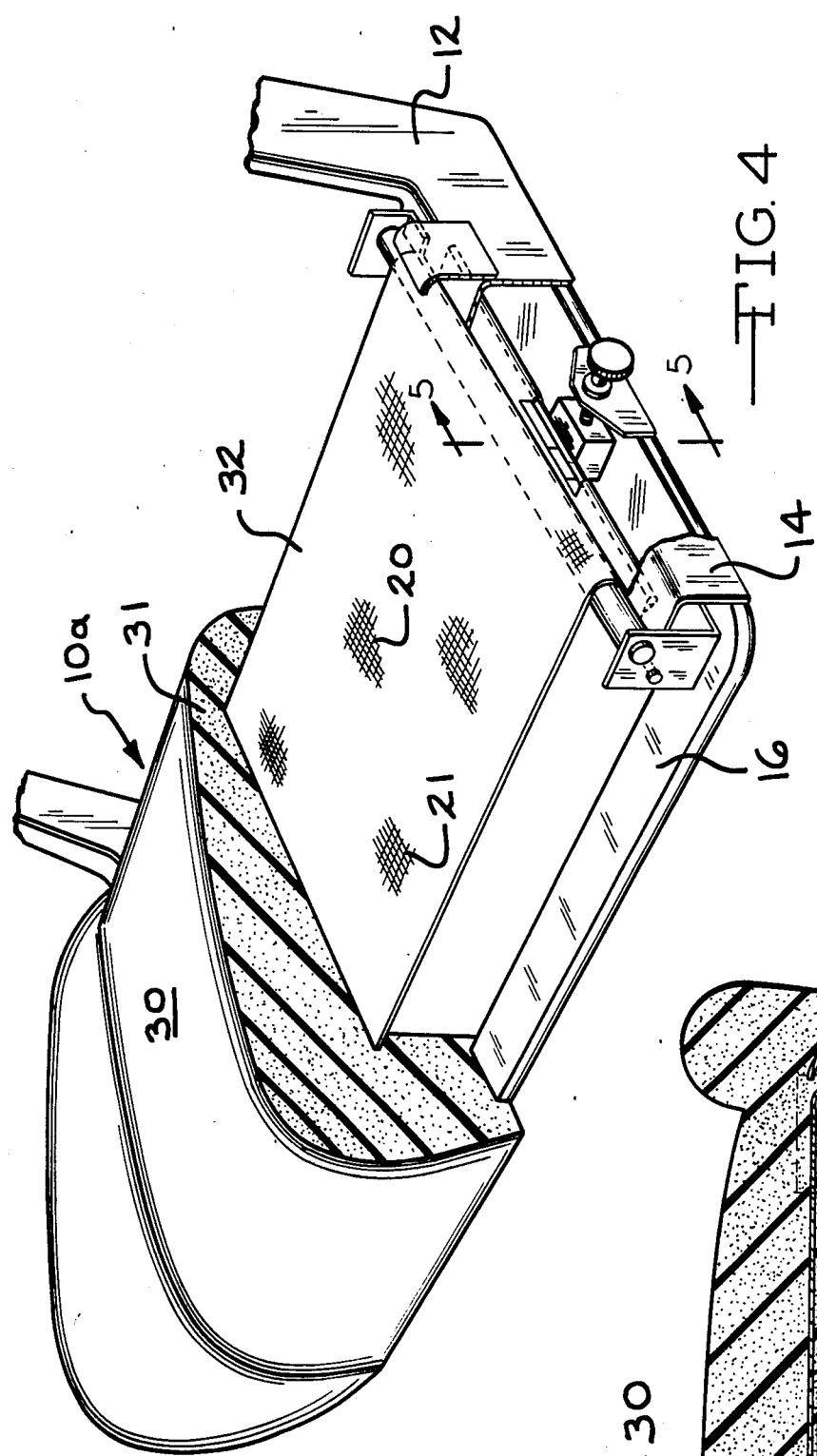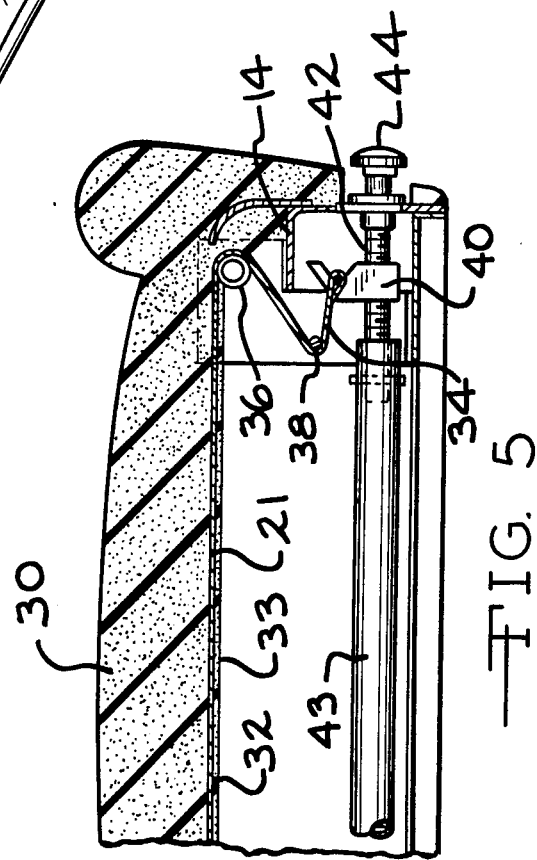

SEAT ASSEMBLY WITH FOAM ENCAPSULATED LOAD-SUPPORTING FIBROUS MATRIX

BACKGROUND OF THE INVENTION

This invention relates generally to the field of seating and more particularly, to seat assemblies for use in vehicles such as automobiles and the like. In the past, most automobile seating involved the use of foam and some type of metal springs. The primary function of the springs was to provide added structural support. During quick loading of the seat or during long-term continuous use of the seat, the seat occupant could feel the springs which thus became a source of discomfort. The past use of fiber matrices has been limited to seat assemblies in which the fiber matrices were used as pads or support members in conjunction with lay-on padding, as shown in U.S. Pat. No. 3,142,073.

This invention provides a seat assembly consisting of a main frame, a seat body formed of a molded foam material and a matrix of fibrous material which functions as a support member encapsulated within the foam body. The matrix is attached to the frame and operates like a network of taut filaments. The foam body is foamed in place on the frame and the matrix so that they are encapsulated in the foam during the molding operation. The result is a vehicle seat assembly in which occupant comfort is not only improved but can be controlled during manufacture so as to provide optimum comfort for various seating requirements.

SUMMARY OF THE INVENTION

The vehicle seat assembly of this invention comprises a main structural frame and a fibrous matrix consisting of a multitude of filaments woven together so that the filaments extend in at least two directions, the matrix being supported in a generally horizontal position on the frame. A foam body is molded in place on the frame so as to encapsulate the matrix in the body in a position forming a support for a portion of the body which constitutes the seat cushion and carries downwardly directed seating loads. The foam acts to hold the filaments in fixed relative positions in which the filaments will vibrate at normal load levels at a compatible normal frequency of vibration. During manufacture of the seat assembly, this frequency can be controlled so as to adapt the seat assembly to the particular environment in which it is going to be used. Stated otherwise, the load-carrying matrix results in reduced bounce of the seat occupant on the seat during travel of the vehicle over uneven terrain. The tension in the matrix can also be adjusted to adapt the seat for use in a vehicle such as a truck, for example, which would be expected to move over more severe uneven terrain and have poorer shock-absorbing characteristics built into the suspension system.

The load-carrying matrix in the seat assembly of this invention eliminates the need for metal springs and provides for a wide distribution of forces throughout the area of the seat, thus eliminating isolated point pressures due to springs located within the seat, as in conventional seating. Also, the encapsulation of the matrix provides for a weight reduction since the fibrous matrix involves considerably less weight than metal springs.

The encapsulated matrix concept is particularly adaptable to molded automobile seating and reduces the requirement for a thick foam body to cover the usual metal springs. The foam encapsulation of the fibrous matrix provides for a unique cooperation between the foam and the filaments in the matrix. The foam locks all of the filaments together thereby providing for more consistent loading of the filaments and a better distribution of the load amongst the various filaments. In turn, the matrix holds the foam together so as to provide for an overall coaction of the foam and the matrix to provide for improved comfort of the seat assembly and better strength characteristics in the assembly.

In one form of the seat assembly of this invention, the tension in the fibrous matrix can be adjusted during use of the seat assembly so that the characteristics of the matrix can be varied to adapt the seat assembly to different levels of seating loads and different seating applications. This enables adjustment of the matrix to maintain a constant H-point (hip location) to maintain a desirable comfort level consistent with the seat occupant's desires.

During manufacture of the seat assembly, the tension in the matrix can be adjusted to achieve the desired vibration dampening characteristics and obtain an optimum normal frequency of vibration for a desired vehicle application. This aspect of seat construction and the effects of the natural frequency of vibration have been largely overlooked in the past even though these factors impact greatly upon the final comfort that can be provided to the seat occupant.

The result is an improved vehicle seat assembly which has better comfort and strength characteristics and is capable of being incorporated in a thin profile seat assembly enabling better utilization of compartment space in the vehicle.

Further objects, features, and advantages of this invention will become apparent from a consideration of the following specification when taken in conjunction with the appended claims and the accompanying drawings in which:

FIG. 4 is a fragmentary perspective view of a portion of a modified form of the seat assembly of this invention, with some parts broken away and other parts shown in section for the purpose of clarity; and FIG. 5 is a fragmentary sectional view of a portion of the seat assembly shown in FIG. 4, as viewed from substantially the line 5—5 in FIG. 4.

Figure 1:
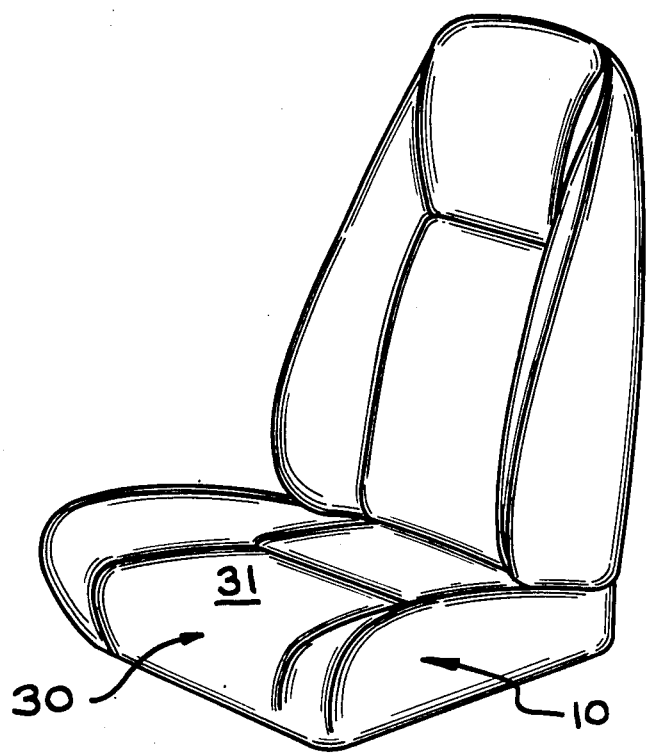
FIG. 1 is a perspective view of the seat assembly of this invention.
Figure 2:
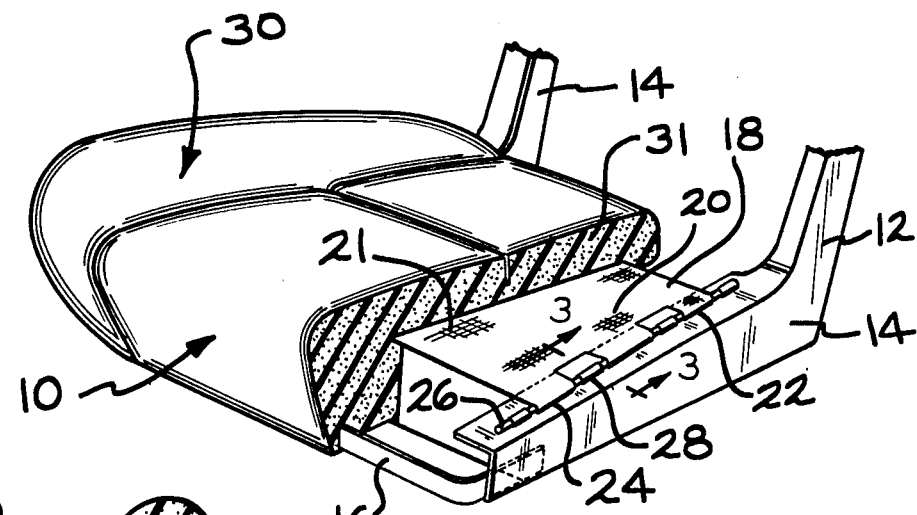
FIG. 2 is a fragmentary perspective view of a portion of the seat assembly of this invention, with some parts broken away and other parts shown in section for the purpose of clarity.

With reference to the drawing, the seat assembly of this invention, indicated generally at 10, is illustrated in FIGS. 1 and 2 as including a main structural frame 12 including side rails 14 connected by a front rail 16. The assembly 10 also includes a fibrous matrix 18, namely, a sheet 18 of woven fibrous material having filaments 20 and 21 extending both generally parallel to the side rails 14 and side-to-side between the rails 14.

The sheet 18 has a pair of ends 22, only one of which is shown, which are identical and are identically mounted on the side rails 14. Each end 22 of the sheet 18 is stitched to form a loop 24 through which a rod 26 is extended. The rod 26 is also extended through aligned bent-out tabs 28 formed in the side rail 14 and which mount the rods 26 in fixed positions on the rails 14 in which the rods are maintained in a predetermined spaced relation.

The sheet 18 is stretched so as to induce tension of a predetermined magnitude into the filaments 21 which extend side-to-side during assembly of the sheet 18 with the frame rails 14. The magnitude of the tension that is induced in the sheet 18 during installation thereof with the side rails 14 is dependent upon the intended use of the seat assembly 10. This tensioning of the filaments 21 is analogous to tuning of the frequency of the matrix 18 to adapt it to automotive or truck use for the purpose of providing a seat assembly 10 of the desired comfort which will yield the desired bounce characteristics when the seat assembly is subjected to shock loading.

Figure 3:
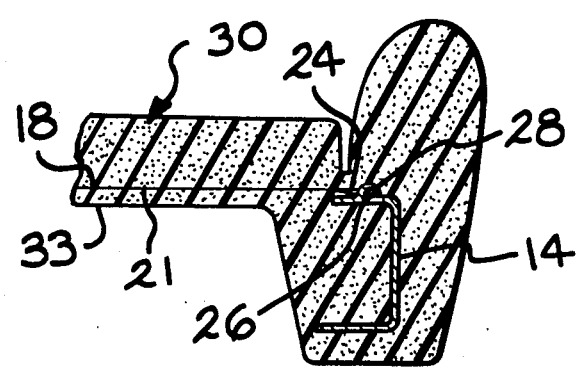
FIG. 3 is an enlarged fragmentary sectional view of a portion of the seat assembly of this invention as viewed from substantially the line 3—3 in FIG. 2.

A foam body 30 of conventional bucket shape, having a seat cushion portion 31, is molded in place on the frame 12 with the tensioning matrix 18 mounted thereon. As shown in FIG. 3, as a result of this molding in place of the foam body 30, the matrix 18 and the frame side rails 14 are fully encapsulated within the foam body 30, with the matrix 18 in a substantially horizontal position in which it will support downwardly directed seating loads applied to the cushion 31. The cushion 31 has a bottom surface 33 and the matrix 18 is encapsulated at a position adjacent this surface. The foam in the body 30 thus functions to lock all of the fibers or filaments 20, 21 together to provide for the desired distribution of seating loads throughout the matrix 18 and avoid areas of stress concentration.

This arrangement also provides a seat assembly of improved comfort which can be used over a prolonged service life. In addition, the matrix 18 cooperates with the foam in the body 30 to hold the foam together thereby eliminating the need for any additional foam unitization material such as has been required in the past. The fibrous material from which the sheet 18 is formed can be either a natural fiber or a fiber formed of polymeric material. The foam in the body 30 can be any suitable foam material such as a urethane foam of the type described in detail in U.S. Pat. No. 3,142,073 previously referred to.

FIGS. 4 and 5 illustrate a modified form of the seat assembly of this invention, indicated generally at 10a, which includes the frame 12 having the side rails 14 and front rail 16 previously described, along with the molded in place foam body 30 which has also been previously described. In the assembly 10a, a woven matrix 32 is used which is formed of the same material as the matrix 18 previously described having filaments 20 and 21. However, in the seat assembly 10a the ends 34 (only one of which is shown) of the matrix 32 are trained about rod-shape guide members 36 and 38 mounted on the side rails 14. The ends 34 of the matrix 32 are connected to movable supports 40, only one of which is shown. Each support 40 is threadably mounted on a threaded section 42 of a shaft 43 which is rotatably mounted on the frame 12 at a position substantially parallel to the front rail 16. An actuating knob or handle 44 is mounted on one end of the shaft 40 at a location readily accessible to the occupant of the seat 10a, so that in response to rotation of the shaft 43 in one direction, the supports 40 can be moved away from each other to increase the tension in the sheet 32 and in response to rotation in the opposite direction the supports 40 are moved toward each other to decrease the tension in the sheet 32.

The result is a seat assembly 10a which consists of the same basic components as the seat 10, namely, a structural frame, a fibrous matrix, and a molded foam seat body but includes the added feature of structure for adjusting the tension in the matrix 32. This enables what may be termed "tuning" of the matrix 32 so that it will vibrate at a compatible normal frequency of vibration at the various seating load levels encountered in a particular vehicle environment with a particular seat occupant. The coaction of the foam in the body 30 and the filaments in the matrix 32 further enhances this capability of the matrix 32 to yield a compatible normal frequency of vibration. The end result is a seat assembly 10 having enhanced occupant comfort characteristics.

From the above description, it is seen that this invention provides improved vehicle seat assemblies 10 and 10a in which a foam encapsulated matrix 18 and 32, respectively, which can also be alternatively described as a membrane, sheet, or the like, cooperates with the supporting frame 12 and the molded in place foam body 30 to provide a wide distribution of seat loading forces which are applied directly to the matrix. A seat with improved comfort characteristics is thus achieved.

What is claimed is:

1. In a vehicle seat assembly for carrying downwardly directed seating loads, a main frame having laterally separated side rails and a front rail, a load supporting fabric sheet having side edges fixed to said side rails and having front and rear edges which are not directly coupled to said main frame, said fabric sheet formed of elastic woven filaments and being normally maintained in a tensioned condition by said side rails, said sheet being supported in a generally horizontal position on said side rails so that at least some of said filaments extend side-to-side in said seat assembly between said side rails and are coupled at both their ends to said side rails, said sheet being able to transfer seating loads to said side rails, a foam body molded in place on said frame so as to substantially encapsulate said rails and said sheet, said sheet being substantially encapsulated in said body in a position forming a support for a portion of said body which constitutes the seat cushion and carries the downwardly directed seating loads, said foam body acting to hold said filaments in fixed relative positons in which said filaments and said foam body cooperate in providing a response to the seating loads.

2. The seat assembly according to claim 1 wherein said body includes a seat cushion portion having a bottom surface and said sheet is disposed in a generally horizontal position and encapsulated in said body at a position adjacent said bottom surface.

3. A seat assembly according to claim 1 further including means on said frame connected to said matrix and operable to maintain and regulate tensile forces in at least some of said filaments.

4. A seat assembly according to claim 3 wherein said means for maintaining tensile forces includes a manually operable control member located on one side of said main frame.

* * * * *